UNITED STATES PATENT OFFICE.

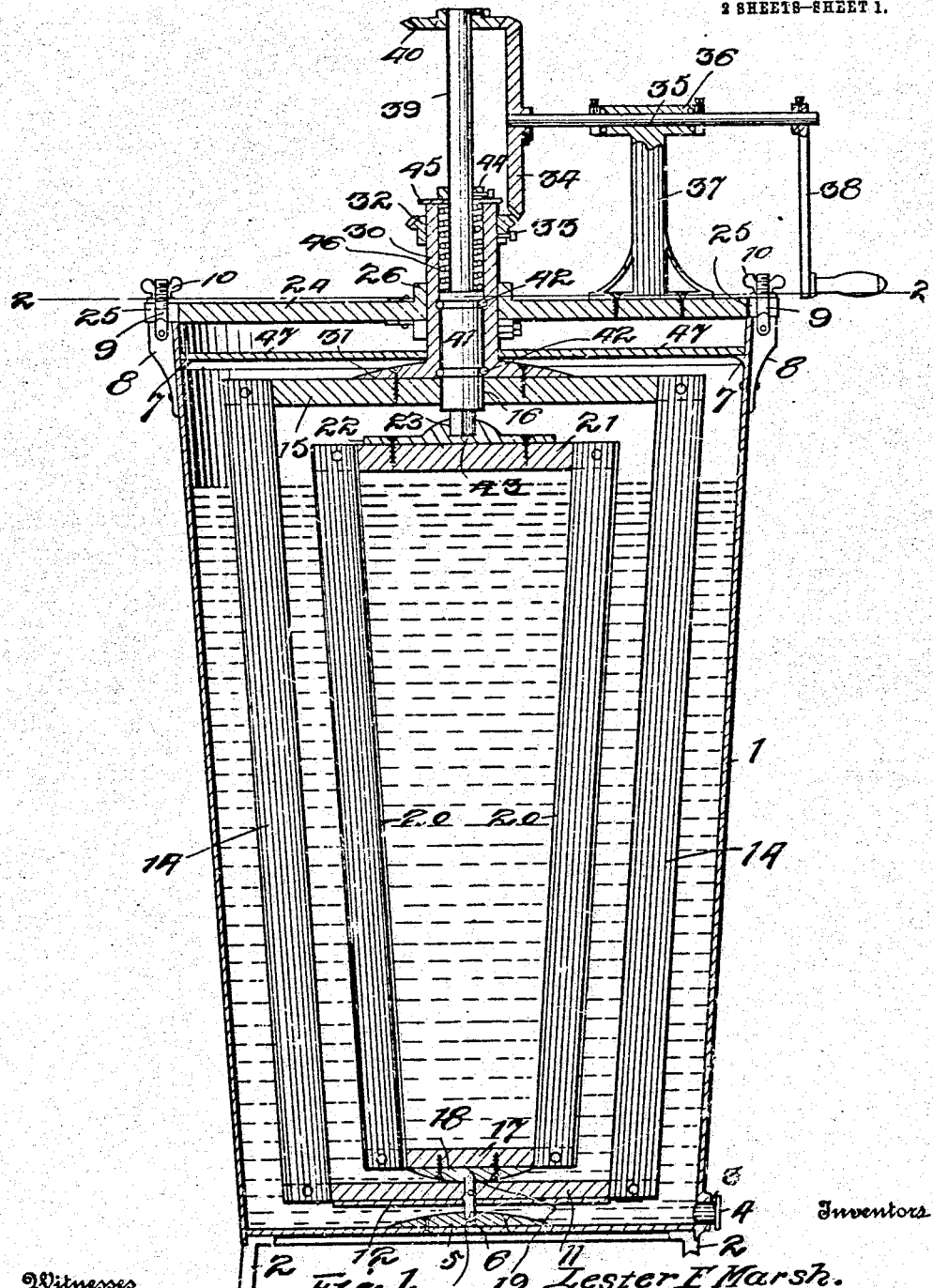

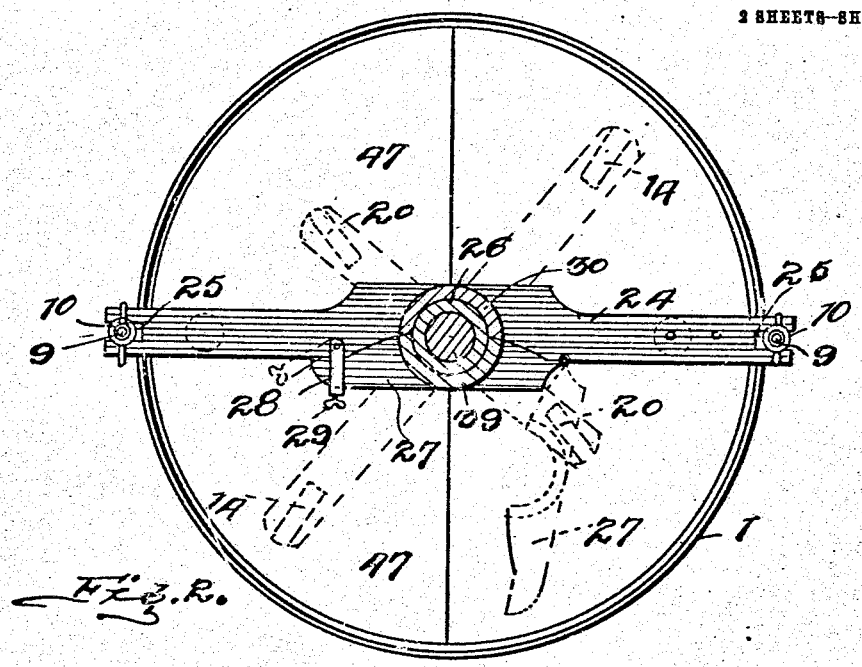
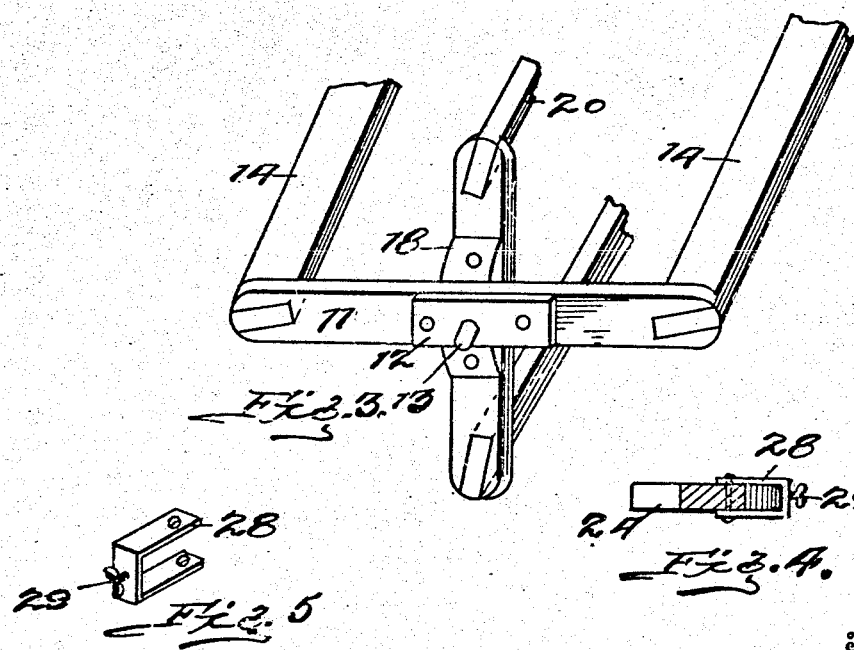

LESTER E. MARSH AND LAWRENCE E. MARSH, OF BLACK LICK, PENNSYLVANIA.

CHURN.

972,556.   Specification of Letters Patent.   Patented Oct. 11, 1910.

Application filed May 7, 1910. Serial No. 559,975.

*To all whom it may concern:*

Be it known that we, LESTER E. MARSH and LAWRENCE E. MARSH, citizens of the United States, residing at Black Lick, in the county of Indiana and State of Pennsylvania, have invented certain new and useful Improvements in Churns, of which the following is a specification, reference being had therein to the accompanying drawing.

This invention relates to churns, and the principal object of the same is to provide a novel arrangement of dashers therefor and means for rotating the same in opposite directions.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a central vertical sectional view of a churn constructed in accordance with this invention. Fig. 2 is a transverse sectional view thereof taken on the line 2—2, Fig. 1. Fig. 3 is a fragmentary detail perspective view of the dashers. Fig. 4 is a detail sectional view of the supporting bar shown in Fig. 3. Fig. 5 is a detail perspective view of the locking clip shown in Figs. 3 and 4.

Referring to said accompanying drawings by numerals, it will be seen that the improved churn comprises a receptacle 1 that is provided with supporting legs 2 and with a lower drain outlet 3 that is normally sealed by a plug 4. The upper surface of the bottom of said receptacle is provided with a central plate 5 having a central bearing 6 formed therein. A supporting ledge 7 is carried by the upper portion of the inner surface of receptacle 1. Externally, the upper end of receptacle 1 is provided with oppositely disposed lugs 8 each having a screw 9 pivotally mounted therein and which carries a clamping nut 10.

The churn is provided with inner and outer dashers, the outer dasher composed of a horizontal base bar 11 provided with a wear plate 12 and a central pivot stud 13 which projects above and below said bar. The lower portion of said stud is journaled in bearing 6 of plate 5. Agitating bars 14 project from the ends of bar 5, the upper ends of bars 14 being connected by a horizontal bar 15 through which a central opening 16 is formed. The inner dasher is composed of a horizontal base bar 17 provided with a bottom plate 18 in which a central bearing opening 19 is formed for the reception of the upper end of pivot stud 13. Agitating bars 20 project from the ends of bar 17, the upper ends of said bars 20 being connected by a horizontal bar 21. Said bar 21 has a plate 22 centrally located on its upper surface which is provided with a squared opening 23. The inner dasher is smaller than the outer dasher and is freely rotatable therein.

A supporting bar 24 extends across the upper end of receptacle 1, the ends of said bar being provided with slots 25 which are engaged by the screws 9 and detachably clamped to the top of receptacle 1 by the nuts 10. Said bar is provided with a central sleeve 26, one portion of which is in the form of a hinged latch 27 that may be locked to the said bar 24 by means of the embracing clip 28 and set screw 29.

A tubular shaft 30 extends through sleeve 26 and has a flange 31 at its lower end that is bolted or otherwise rigidly but detachably fastened to upper bar 15 of the outer dasher. The projected upper portion of shaft 30 has a gear wheel 32 rigidly but detachably fastened thereon by means of a set screw 33, said gear being in mesh with the lower portion of a gear 34 carried by one end of a shaft 35 that is mounted in bearings 36 at the upper end of a standard 37 projecting from supporting bar 24. A crank handle 38 is carried by shaft 35 to facilitate manual rotation of said shaft.

A shaft 39 projects through tubular shaft 30, the upper end of which is provided with a gear wheel 40 that is in mesh with the upper portion of gear 34. Shaft 39 has an enlarged lower portion 41 that is rotatable within shaft 30, antifriction bearing 42 being interposed between the said enlarged lower portion 41 and shaft 30. Said enlarged portion 41 projects through opening 16 of dasher bar 15 and terminates in a reduced squared extension 43 that is fitted within opening 23 of plate 22 of dasher bar 21. Said shaft 39 carries an adjustable collar 44 which clamps a plate 45 over the open upper end of tubular shaft 30.

A spring 46 is coiled about shaft 39 within tubular shaft 30, one end of said spring bearing against the upper portion of enlargement 41 of shaft 39, the other end of said spring bearing against plate 45. As will be obvious, said spring is constantly exerting a pressure on shaft 39 tending to retain its squared extension 43 in engagement with opening 23.

A cover is provided for the churn, said cover being formed of duplicate sections 47 which are seated on ledge 7.

It will be seen from the foregoing that by rotating shaft 35, the inner and outer dashers will be rotated in opposite directions. It will also be seen that by releasing supporting bar 24 from receptacle 1, the entire operating mechanism may be removed from the receptacle, and also that by releasing collar 44, shaft 39 may be released from the inner dasher and removed from shaft 39, which permits access to be readily had to all parts of the churn so that they may be thoroughly cleaned.

What we claim as our invention is:—

1. A churn comprising a receptacle, inner and outer dashers rotatably mounted therein, a supporting bar carried by the upper end of said receptacle, a tubular shaft journaled in said bar and engaging the outer dashers, a second shaft extending through the tubular shaft, said second shaft engaging the inner dashers and provided with an enlarged portion, a plate carried by the tubular shaft, a spring on said second shaft and interposed between said plate and the enlarged portion of said shaft, and means for rotating said shafts in an opposite direction.

2. A churn comprising a receptacle, inner and outer dashers rotatably mounted therein, a supporting bar detachably fastened to the upper end of said receptacle, a tubular shaft rotatable in said bar and having one end connected to the outer dasher, a shaft extending through the tubular shaft and engaging the inner dasher, means for yieldably holding said shaft in engagement with said inner dasher, and means for rotating said shafts in an opposite direction.

3. A churn comprising a receptacle, inner and outer dashers rotatable therein, a tubular shaft connected to one of said dashers, a shaft extending through said tubular shaft and engaging the other dasher, a spring carried by the last-mentioned shaft for normally holding the same in engagement with its dasher, and means for rotating said shafts in an opposite direction.

4. A churn comprising a receptacle, inner and outer dashers rotatably mounted therein, a support carried by said receptacle, a tubular shaft journaled therein and engaging the outer dashers, a second shaft extending through the tubular shaft and rotatable therein, said second shaft engaging the inner dashers, means exerting a pressure on the second shaft to retain the same in engagement with the inner dashers, and means for rotating said shafts in an opposite direction.

5. A churn comprising a receptacle, oppositely disposed screws pivotally connected to the upper end thereof, dashers for said receptacle, a supporting bar extending across the top of said receptacle and provided with slotted ends for the reception of said screws, dasher-operating mechanism carried by said bar, and clamping nuts carried by said screws for detachably fastening said bars to said receptacle.

In testimony whereof we hereunto affix our signatures in presence of two witnesses.

LESTER E. MARSH.
LAWRENCE E. MARSH.

Witnesses:
CHAS. H. MOORE,
H. A. GONTZ.